US008097056B2

(12) United States Patent
Sasano et al.

(10) Patent No.: US 8,097,056 B2

(45) Date of Patent: Jan. 17, 2012

(54) AIR CLEANER UNIT FOR INTERNAL COMBUSTION ENGINE

(75) Inventors: Norihisa Sasano, Yatomi (JP); Akihiro Maeda, Kariya (JP); Akira Nakawatase, Toyota (JP); Ryuji Kanzaka, Nishikamo-gun (JP); Yuji Matsubara, Toyota (JP); Shingo Kimura, Ikeda (JP); Akira Enomoto, Kariya (JP); Kazuya Tanaka, Kariya (JP)

(73) Assignee: Toyota Boshoku Kabushiki Kaisha, Kariya (JP)

(*) Notice: Subject to any disclaimer, the term of this patent is extended or adjusted under 35 U.S.C. 154(b) by 318 days.

(21) Appl. No.: 12/516,507

(22) PCT Filed: Mar. 21, 2008

(86) PCT No.: PCT/JP2008/056003

§ 371 (c)(1), (2), (4) Date: May 27, 2009

(87) PCT Pub. No.: WO2008/123392

PCT Pub. Date: Oct. 16, 2008

(65) Prior Publication Data

US 2010/0050980 A1 Mar. 4, 2010

(30) Foreign Application Priority Data

Mar. 30, 2007 (JP) ................................ 2007-093419

(51) Int. Cl.
*B01D 46/00* (2006.01)

(52) U.S. Cl. ............................ 55/385.3; 55/497; 55/502

(58) Field of Classification Search ................. 55/385.3, 55/481, 493, 497, 499, 502, 521, 498; 123/198 E
See application file for complete search history.

(56) References Cited

U.S. PATENT DOCUMENTS

| | | | | |
|---|---|---|---|---|
| 4,925,469 | A * | 5/1990 | Clement et al. | 55/480 |
| 5,213,596 | A * | 5/1993 | Kume et al. | 55/481 |

(Continued)

FOREIGN PATENT DOCUMENTS

| | | | |
|---|---|---|---|
| EP | 1 277 946 | A1 | 1/2003 |

(Continued)

OTHER PUBLICATIONS

Office Action dated Jul. 13, 2010 in corresponding Japanese application No. 2007-93419.

*Primary Examiner* — Duane Smith
*Assistant Examiner* — Minh-Chau Pham
(74) *Attorney, Agent, or Firm* — Harness, Dickey & Pierce, PLC

(57) ABSTRACT

An air cleaner unit for an internal combustion engine includes a casing and a filter element disposed in the casing. The casing includes a first case member having a first opening and a first sealing surface on a periphery of the first opening and a second case member having a second opening and a second sealing surface on a periphery of the second opening. The first case member and the second case member are coupled such that the first and second openings are opposed in a substantially horizontal direction of a vehicle. The filter element has a peripheral portion that is interposed between the first sealing surface and the second sealing surface. The first case member includes a side wall and a projection that projects from an inner surface of the side wall. The filter element is held in a substantially vertical position in the casing through the projection.

17 Claims, 6 Drawing Sheets

U.S. PATENT DOCUMENTS

| | | | | | |
|---|---|---|---|---|---|
| 5,472,379 | A * | 12/1995 | Andress et al. | ............... | 454/158 |
| 5,605,554 | A * | 2/1997 | Kennedy | ......................... | 55/493 |
| 5,730,768 | A * | 3/1998 | Kaminaga et al. | ........... | 55/385.3 |
| 6,231,630 | B1 * | 5/2001 | Ernst et al. | ................... | 55/385.3 |
| 6,725,905 | B2 | 4/2004 | Hirano et al. | | |
| 7,473,292 | B2 * | 1/2009 | Moriyama et al. | .............. | 55/502 |
| 7,833,300 | B2 * | 11/2010 | Taniuchi et al. | ............. | 55/385.3 |
| 2002/0116909 | A1 * | 8/2002 | Onoda | ............................ | 55/498 |
| 2003/0051453 | A1 | 3/2003 | Moreau et al. | | |
| 2008/0314357 | A1 | 12/2008 | Sasno et al. | | |

FOREIGN PATENT DOCUMENTS

| | | | |
|---|---|---|---|
| JP | 08-281033 | | 10/1996 |
| JP | H11-171041 | A | 6/1999 |
| JP | 2002-70552 | A | 3/2002 |
| JP | 2003-343371 | A | 12/2003 |
| JP | 2004-132239 | | 4/2004 |
| JP | 2005-61382 | A | 3/2005 |

* cited by examiner

AIR CLEANER UNIT FOR INTERNAL COMBUSTION ENGINE

CROSS REFERENCE TO RELATED APPLICATION

This application is based on Japanese Patent Application No. 2007-93419 filed on Mar. 30, 2007, the disclosure of which is incorporated herein by reference.

TECHNICAL FIELD

The present invention relates to an air cleaner unit for an internal combustion engine, the air cleaner unit having a casing constructed of plural case members and a filter element held in the casing in a vertical position.

BACKGROUND ART

In order to ease assembling of engine functional devices to a vehicle, such as an automobile, it is known to integrally form a part of an air cleaner unit, such as an air cleaner case, an outside air introduction duct connected to the air cleaner case, and the like, with another member of the vehicle, such as an engine head cover, an intake manifold, or a fan shroud of a radiator. For example, Japanese Unexamined Patent Application Publication No. 2002-70552 describes a radiator apparatus in which an air intake duct of an air cleaner unit is integrally molded with a fan guide. Japanese Unexamined Patent Application Publication No. 2003-343371 describes an air cleaner unit in which an air cleaner case is integrated with an engine head cover.

Also, in an air cleaner unit described in Japanese Unexamined Patent Application Publication No. 2005-61382, an air cleaner case is connected to another member of a vehicle, and an air cleaner cap is coupled to the air cleaner case to cover an opening of the air cleaner case. The air cleaner case defines an outside air introduction passage through which air to be introduced to an engine flows, with the air cleaner cap. A filter element is disposed in the outside air introduction passage for filtering the air. Further, a peripheral portion of the filter element is disposed between a sealing surface of the air cleaner case and a sealing surface of the air cleaner cap, so that the filter element is held in a horizontal position, which is perpendicular to an up and down direction of the vehicle. The sealing surfaces of the air cleaner case and cap are formed on peripheries of the openings thereof and have a substantially loop shape.

In order to address a requirement of reducing a mounting space of an air cleaner unit, that is to reduce a size of he air cleaner unit, it is proposed to integrally mold an air cleaner case with another member of a vehicle, such as a fan shroud of a radiator, and to arrange a filter element in a vertical position, which is substantially perpendicular to a horizontal direction of the vehicle, in an outside air introduction passage defined in the air cleaner unit. FIG. 7 shows an example of the air cleaner unit in which the filter element is disposed in the vertical position.

The air cleaner unit shown in FIG. 7 is configured such that a filter element 101 is held by interposing a peripheral portion 102 between a sealing surface 104 of an air cleaner case 103 and a sealing surface of an air cleaner cap. Thus, it is necessary to hold the filter element 101 such that the peripheral portion 102 is in contact with the sealing surface 104 of the air cleaner case 103 while the air cleaner cap is being fixed to an opening 105 of the air cleaner case 103. Therefore, working efficiency is likely to reduce. If a worker releases his hands from the filter element 101 before the air cleaner cap is fixed to the opening 105 of the air cleaner case 103, the filter element 101 will be dropped from the air cleaner case 103, as shown by an arrow in FIG. 7.

DISCLOSURE OF THE INVENTION

It is an object of the present invention to provide an air cleaner unit for an internal combustion engine of a vehicle, which is capable of holding a filter element by a first case member. It is another object of the present invention to provide an air cleaner unit for an internal combustion engine of a vehicle, which is capable of improving working efficiency.

According to an aspect of the present invention, an air cleaner unit for an internal combustion engine of a vehicle includes a casing defining an intake air passage through which air to be introduced to the engine flows and a filter element disposed in the casing for filtering the air. The casing includes a first case member and a second case member. The first case member has a first opening and a first sealing surface on a periphery of the first opening. The second case member has a second opening and a second sealing surface on a periphery of the second opening. The first case member and the second case member are coupled such that the first opening is opposed to the second opening in a substantially horizontal direction of the vehicle. The filter element has a peripheral portion that is interposed between the first sealing surface and the second sealing surface. The first case member further includes a side wall defining the intake air passage and a projection projecting from an inner surface of the side wall toward the intake air passage. The filter element is held in a substantially vertical position through the projection.

When the filter element is assembled to the first case member, the filter member contacts or is engaged with the projection so that the filter element is held in the vertical position solely by the first case member. Namely, the filter element is held through the projection, and it is less likely that the filter element will be dropped from the first case member. Thus, the second case member is easily assembled to the first case member. Also, even when the second case member is removed from the first case member, such as for the purpose of replacement of the filter element, the filter element will not drop from the first case member. Accordingly, working efficiency improves.

BRIEF DESCRIPTION OF THE DRAWINGS

Other objects, features and advantages of the present invention will become more apparent from the following detailed description made with reference to the accompanying drawings, in which like parts are designated by like reference numbers and in which.

BEST MODES FOR CARRYING OUT THE INVENTION

Figure 1:
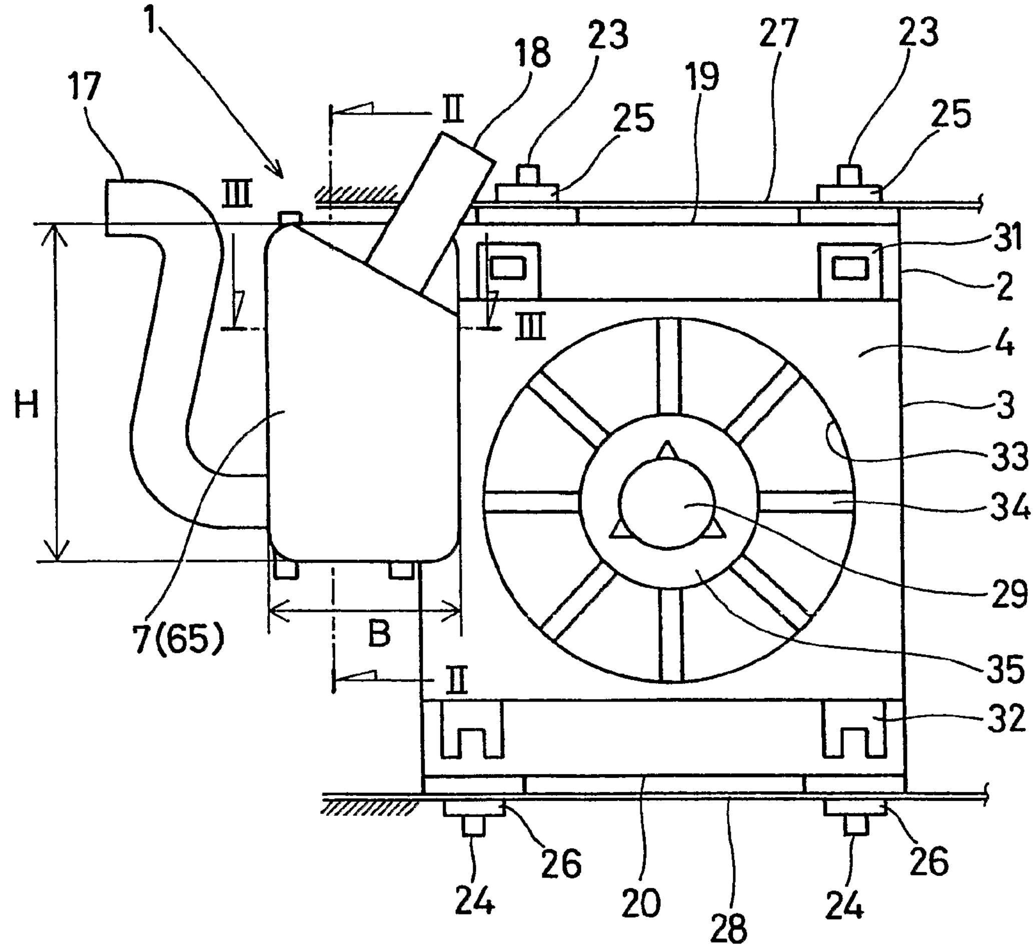
FIG. 1 is a view of an air cleaner unit integrated with a fan shroud according to a first embodiment of the present invention.

An exemplary embodiment of the present invention will now be described with reference to FIGS. 1 to 6. An air cleaner unit 1 for an internal combustion engine (hereinafter, the engine) is integrally connected to another member (e.g., body member) of a vehicle. In the embodiment shown in FIG. 1, the air cleaner unit 1 is integrally connected to a radiator 2 as the body member through a fan shroud 3 as an engine functional device.

The air cleaner unit 1 generally includes a separable casing (housing) and a filter element (air cleaner element) 5. The casing defines an intake air passage through which air to be introduced toward the engine flows. The filter element 5 is accommodated in the casing for filtering the air. The casing is constructed of plural case members, which are coupled in a substantially horizontal direction of the vehicle, such as in a vehicle front and rear direction. In other words, the casing has a separation line along which the casing is separated into at least two case members, the separation line being substantially parallel to an up and down direction of the vehicle. For example, the horizontal direction of the vehicle is a direction parallel to a horizontal plane of the vehicle, the horizontal plane being parallel to a surface that the vehicle travels on. Also, the up and down direction of the vehicle is a direction substantially perpendicular to the horizontal plane of the vehicle.

For example, the casing is constructed of an air cleaner case 6 and an air cleaner cap 7 as the case members. The air cleaner case (e.g., a first case member) 6 is disposed at a front end portion of the vehicle such that an opening (e.g., a first opening) 11 of the case 6 faces in the substantially horizontal direction, such as in a vehicle rearward direction. The air cleaner cap (e.g., a second case member) 7 is disposed to cover the first opening 11 of the case 6. The cap 7 has an opening (e.g., a second opening) 12 and is connected to the case 6 such that the first and second openings 11, 12 are opposed in the substantially horizontal direction, such as in the vehicle front and rear direction, and engaged with each other. Further, the case 6 and the cap 7 are secured by a metallic clamp 8.

The case 6 has a first flange portion defining a first element sealing portion 13 on the periphery of the first opening 11. The cap 7 has a second flange portion defining a second element sealing portion 14 on the periphery of the second opening 12. The first and second element sealing portions 13, 14 provide sealing surfaces.

Figure 2:
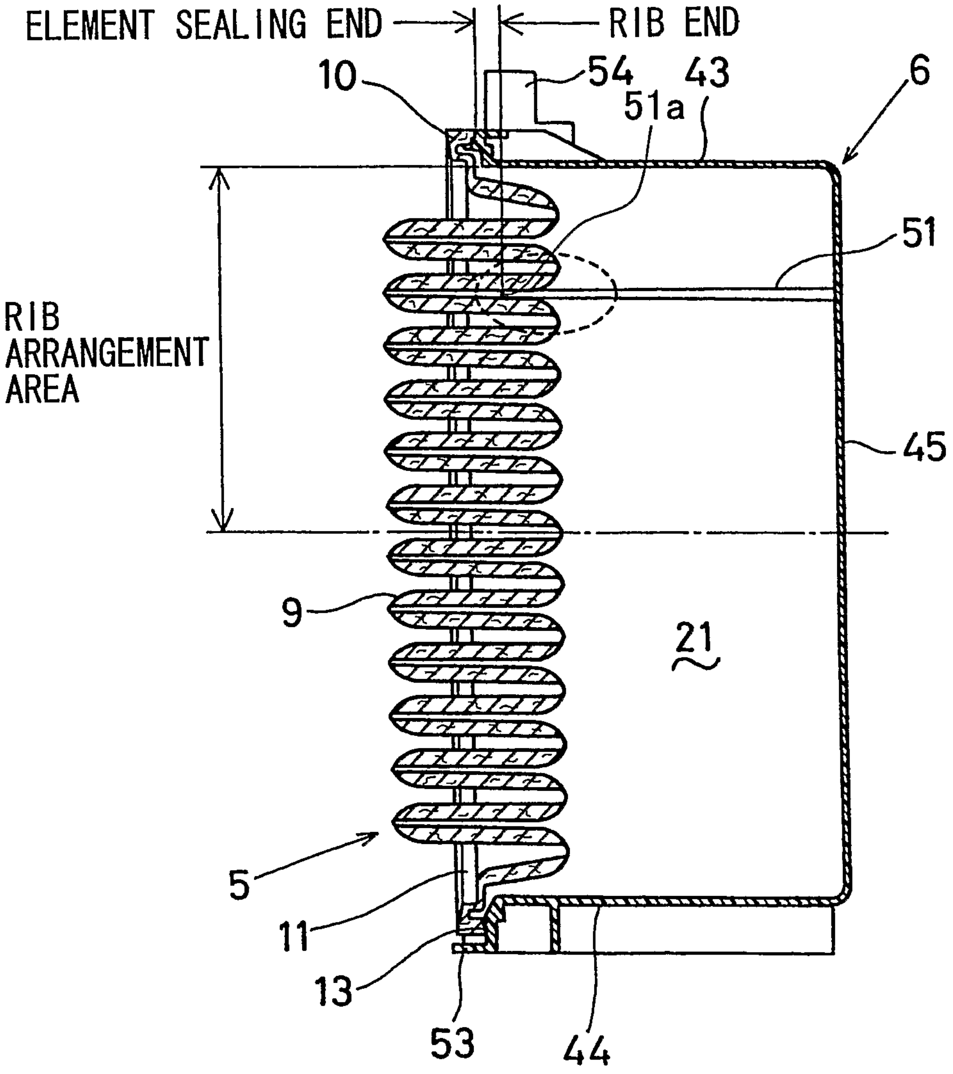
FIG. 2 is a cross-sectional view of an air cleaner case of the air cleaner unit taken along a line II-II in FIG. 1.

As shown in FIG. 2, the filter element 5 includes an element body 9 and a peripheral portion (peripheral sealing portion) 10 on a periphery of the element body 9. The peripheral portion 10, for example, has a substantially square or rectangular loop shape. The filter element 5 is disposed in the casing in a vertical position in a condition that the peripheral portion 10 is interposed between the sealing surface of the first element sealing portion 13 and the sealing surface of the second element sealing portion 14. That is, the filter element 5 is disposed substantially parallel to the vehicle up and down direction.

In the present embodiment, the case 6 and the cap 7 are coupled in the vehicle front and rear direction. The filter element 5 is held in the vertical position that is substantially perpendicular to the vehicle front and rear direction and substantially parallel to a vehicle right and left direction (i.e., vehicle width direction) that is perpendicular to the vehicle front and rear direction.

The first element sealing portion 13 of the case 6 is formed with an engagement projection 15. For example, the engagement projection 15 is formed entirely along the first element sealing portion 13, thus has a square or rectangular loop shape. The peripheral portion 10 of the filter element 5 is in pressed contact with the engagement projection 15 and compressed.

Further, the case 6 and the cap 7 respectively have a first element housing portion and a second element housing portion in the first and second openings 11, 12 for housing the filter element 5. The first and second element housing portions form a substantially rectangular parallelepiped space in which the filter element 5 is disposed.

The casing has an inlet duct (first outside air introduction duct) 17 for introducing air, such as outside air, into the inside of the casing and an outlet duct (second outside air introduction duct) 18 for introducing the air that has passed through the filter element 5 inside of the casing toward an intake pipe of the engine.

For example, the inlet duct 17 is integrally formed with the case 6. The outlet duct 18 is integrally formed with the cap 7. The case 6 forms a first outside air introducing passage 21 therein through which the air introduced from the inlet duct 17 flows. The cap 7 forms a second outside air introducing passage 22 therein through which the air that has passed through the first outside air introducing passage 21 and the filter element 5 flows. The first outside air introducing passage 21 and the second outside air introducing passage 22 form the intake air passage. The intake air passage is in communication with intake air ports and combustion chambers of the engine. The case 6 is made of a resin, and is integrally molded with the fan shroud 3 of the radiator 2, for example.

The engine is mounted in an engine compartment of a vehicle, such as an automobile. For example, the engine is a water-cooled gasoline engine that generates power from heat energy that is generated by combustion of a mixed air of the intake air and fuel in the combustion chambers. The engine has the intake pipe for introducing the intake air into the combustion chambers and an exhaust pipe for discharging exhaust gas from the combustion chambers. Further, the engine is provided with an engine cooling unit including an engine coolant circuit through which an engine coolant circulates.

The engine is constructed of a cylinder head, a cylinder block and the like. The cylinder head forms the intake air ports (intake ports) on one side and exhaust air ports (exhaust ports) on an opposite side. The intake air ports are opened and closed by poppet-like intake valves and the exhaust air ports are opened and closed by poppet-like exhaust valves.

The intake pipe is coupled to the intake air ports, and the exhaust pipe is coupled to the exhaust air ports. The cylinder block forms cylinder bores therein. Pistons are supported by a crankshaft to reciprocate in the cylinder bores. Further, a water jacket is formed inside of the cylinder head and the cylinder block, such as to surround peripheries of the cylinder bores.

The engine cooling unit generally includes the engine coolant circuit through which the engine coolant for cooling an engine main unit (e.g., the cylinder head, the cylinder block, etc.) flows and a heat exchanger air-blowing unit for forcibly introducing cooling air to the engine main unit.

The engine coolant circuit includes a water pump, a thermostat, the radiator 2 and the like. The water-cooled gasoline engine is constructed such that the engine coolant is forcibly circulated through the water jacket. Thus, the engine is cooled to an appropriate temperature such that components of the engine are efficiently operated.

The water pump is provided to forcibly introduce the engine coolant from the radiator 2 to the water jacket of the engine. The water jacket is rotationally driven by the crankshaft. The thermostat serves as an automatic control valve for controlling the temperature of the coolant. The thermostat is disposed on a radiation passage through which the engine coolant passing through the tubes of the radiator 2 flows. When the temperature of the engine coolant is lower than a predetermined temperature (e.g. 85° C.), the thermostat fully closes the radiation passage so that the engine coolant is introduced to a bypass passage while bypassing the radiator 2. As such, the engine is smoothly heated to the appropriate temperature by switching the passage by the thermostat.

In the engine compartment, the radiator 2 is mounted at a location where air is easily supplied, such as at the front end portion of the vehicle. For example, the radiator 2 is located immediately behind a front grill member that defines openings for introducing the cooling air into the engine compartment. The radiator 2 performs heat exchange between the cooling air that flows between tubes and the coolant that flows inside of the tubes, thereby cooling the coolant. The flow of the cooling air is created as the vehicle travels and by the heat exchanger air-blowing unit. Thus, the radiator 2 serves as a heat exchanger for cooling the coolant.

For example, the radiator 2 includes an upper tank 19, a lower tank 20 and a layered-type core between the upper tank 10 and the lower tank 20. The core is constructed by alternately layering the tubes and fins. The tubes form passages therein through which the coolant flows.

Each of the upper tank 19 and the lower tank 20 has two shroud fixing portions for fixing the fan shroud 3 of the heat exchanger air-blowing unit to the radiator 2. The upper tank 19 has support pins 23 on its top wall. The support pins 23 project in an upward direction. The lower tank 20 has support pins 24 on its bottom wall. The support pins 24 project in a downward direction. The radiator 2 is fixed to parts (members) 27, 28 of the vehicle, such as front side members, a bracket, a frame, a body of the vehicle, and the like, through the support pins 23, 24. In the present embodiment, for example, the radiator 2 is fixed to the vehicle body 27, 28.

Cylindrical rubber members (rubber mounts) 25, 26 are fitted on the peripheries of the support pins 23, 24. The rubber members 25, 26 serves as shock absorber when the radiator 2 is mounted to the parts 27, 28 through the support pins 23, 24.

The heat exchanger air-blowing unit is located between the engine and the radiator 2. For example, the heat exchanger air-blowing unit is located on a rear side of the radiator 2. The heat exchanger air-blowing unit generally includes an electric blower and the fan shroud 3 that surrounds the electric blower. The electric blower is operated to cause the cooling air to flow from the front grill member toward the engine through the core of the radiator 2.

The electric blower includes an axial-flow fan that generates the flow of air in an axial direction, and an electric motor 29 for rotating the axial-flow fan. The axial-flow fan includes a boss portion fitted to a rotation shaft of the electric motor 29 and blades radially extending from the boss portion.

The fan shroud 3 includes a shroud body 4 that surrounds a clearance between the radiator 2 and the electric fan. The fan shroud 3 is provided to restrict the flow of air created by the electric fan from bypassing the core of the radiator 2. That is, the fan shroud 3 is provided to direct the flow of air created by the electric fan to pass through the core of the radiator 2.

The fan shroud 3 is integrally formed of a resin material, such as a thermoplastic resin (e.g., polypropylene) and has a predetermined shape. Also, the case 6 of the air cleaner unit 1 is integrally formed with the fan shroud 3.

The fan shroud 3 including the shroud body 4 and the case 6 is a thermoplastic resin product (molded article) that is formed by integrally molding. For example, the fan shroud 3 is formed by melting the resin material in the form of pellet, injecting the molten resin into a cavity defined in a die, cooling the injected resin in the cavity and removing the molded article from the die.

The shroud body 4 has a substantially polygonal tubular shape having a square or rectangular-shaped cross-section. The shroud body 4 includes a pair of transverse walls, such as an upper wall and a lower wall, which are opposed to each other in the up and down direction of the vehicle. Further, the shroud body 4 includes a pair of vertical walls, such as a right and left walls, which are opposed to each other in the substantially horizontal direction, such as the substantially right and left direction of the vehicle. The axial-flow fan is disposed in the fan shroud 4 such that the rotation axis is aligned with an axis of the tubular shaped shroud body 4. For example, the axial-flow fan is disposed such that the rotation axis is substantially parallel to the vehicle front and rear direction.

The upper wall of the shroud body 4 is integrally formed with fixing stays 31. The fixing stays 31 are fixed to shroud fixing portions of the upper tank 19 of the radiator 2 by fixing parts such as bolts. The lower wall of the shroud body 4 is integrally formed with fixing stays 32. The fixing stays 32 are fixed to shroud fixing portions of the lower tank 20 of the radiator 2 by fixing parts such as bolts.

The shroud body 4 has openings 33 at its middle portion, and through which the air blown by the electric fan passes. Further, the fan shroud 3 has fixing stays 34 and motor fixing portion 35 on an inner periphery of the fixing stays 34. The fixing stays 34 and the motor fixing portion 35 are integrally formed with the shroud body 4. The electric fan, particularly, the electric motor 29 is fixed to the motor fixing portion 35.

The air cleaner unit 1 is located at an upstream-most position of an air intake system of the engine, such as, an upstream-most position of the intake pipe of the engine. The filter element 5 is disposed in the casing of the air cleaner unit 1 for filtering the intake air passing through the intake air passage. The filter element 5 captures impurities, such as dusts, contained in the outside air, so as to reduce engine sliding abrasion.

The filter element 5 includes the element body 9 having a substantially square or rectangular shape and the peripheral portion 10 along the periphery of the element body 9. As shown in FIG. 2, the element body 9 is, for example, made of unwoven cloth that is folded or pleated in the up and down direction.

The peripheral portion 10 is integrally formed with the element body 9. The peripheral portion 10 forms a soft frame having a square or rectangular loop shape. The peripheral portion 10 includes an upper wall, a lower wall, side walls. The upper wall and the lower wall are located along sides that are opposed in the up and down direction, which is perpendicular to a flow direction of the intake air in the casing, that is, axes of the first and second outside air introduction passages 21, 22. The side walls are located along sides that are opposed in the horizontal direction, such as in the right and left direction.

The peripheral portion 10 serves to seal with the sealing surface of the first element sealing portion 13 of the case 6 and the sealing surface of the second element sealing portion 14 of the cap 7. Further, the peripheral portion 10 is in pressed contact with the engagement projection 15 of the first element sealing portion 13.

The casing of the air cleaner unit 1 has a substantially rectangular parallelepiped box shape, and has a height H in the vehicle up and down direction, a width B in the vehicle right and left direction, and a depth in the vehicle front and rear direction. The casing is constructed by joining the case 6 and the cap 7 at the first and second openings 11, 12.

The case 6 is a container-like member, and is integrally formed with the shroud body 4 of the fan shroud 3. In the embodiment shown in FIG. 1, the case 6 is integrally molded with the left wall of the shroud body 4, for example. The fan shroud 3 is mounted to the radiator 2, which is fixed to the portions 27, 28 of the vehicle body, through the fixing stays 31, 32. Therefore, the case 6 is fixed to the portions 27, 28 of the vehicle body by fixing the fan shroud 3 to the radiator 2. In other words, the case 6 is fixed to the portions 27, 28 of the vehicle body through the fan shroud 3 and the radiator 2.

Further, the case 6 is formed of the same resin material as the fan shroud 3. The case 6 includes a peripheral side wall having a polygonal tubular shape, and defines the first outside air introduction passage 21 therein. The polygonal tubular shape, for example, has a square or rectangular-shaped cross-section.

Figure 3:
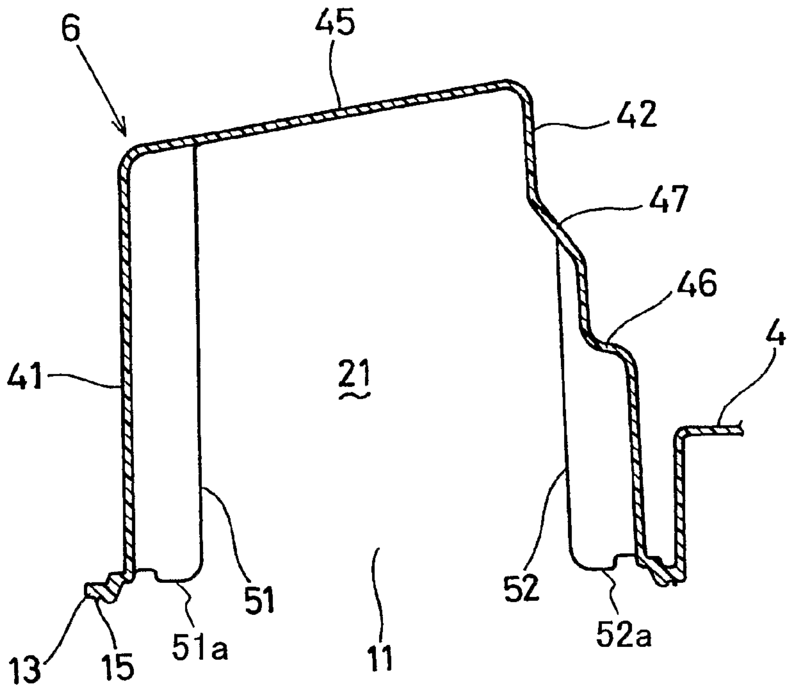
FIG. 3 is a cross-sectional view of the air cleaner case taken along a line III-III in FIG. 1.

As shown in FIG. 3, the peripheral side wall includes a left side wall portion 41 and a right side wall portion 42. The left side wall portion 41 and the right side wall portion 42 are opposed in the substantially horizontal direction, such as in the vehicle right and left direction, and extend in the substantially up and down direction. Further, the tubular portion includes an upper wall portion 43 and a lower wall portion 44. The upper wall portion 43 and the lower wall portion 44 are opposed in the vehicle up and down direction, and extend in the substantially horizontal direction.

The peripheral side wall defines an opening at its first axial end as the first opening 11 and has an end wall 45 at its second axial end. That is, the first opening 11 and the end wall 45 are opposed with respect to an axial direction of the tubular-shaped peripheral side wall. The case 6 is disposed such that the first opening 11 faces in the vehicle rearward direction, and the end wall 45 faces in the vehicle frontward direction. In other words, the case 6 is disposed such that the end wall 45 is located on a front side of the tubular-shaped peripheral side wall. The end wall 45 extends in the substantially up and down direction.

Further, the first opening 11 is coupled to the second opening 12 of the cap 7 through the element body 9 of the filter element 5, so that the first outside air introduction passage 21 is in communication with the second outside air introduction passage 21 through the element body 9.

The right and left side wall portions 41, 42 and the end wall 45 extend in the substantially up and down direction of the vehicle. The upper and lower wall portions 43, 44 extend in the right and left direction of the vehicle. The right side wall portion 42, which is closer to the shroud body 4 than the left side wall portion 41, has a first step portion 46 and a second step portion 47. The first step portion 46 and the second step portion 47 are opposed to a clean side of the filter element 5. That is, the first and second step portions 46, 47 form inner surfaces opposed to the filter element 5. Further, the second step portion 47 forms an inclined wall that is inclined relative to the front and rear direction.

The case 6 has the first flange portion on the periphery of the first opening 11. The first element sealing portion 13 is formed on the surface of the first flange portion, the surface facing the filter element 5, that is, being opposed to the second element sealing portion 14 of the cap 7. The first element sealing portion 13 is in closely contact with the clean side (e.g., front side) of the peripheral portion 10 of the filter element 5. The first element sealing portion 13 has the engagement projection 15, which has a square or rectangular looped shape. The engagement projection 15 projects from the sealing surface of the first element sealing portion 13 toward the filter element 5. The engagement projection 15 is in pressed contact with the peripheral portion 10 of the filter element 5.

The first element sealing portion 13 includes an upper portion and a lower portion that extend in the vehicle right and left direction. The upper portion and the lower portion are respectively located at the ends of the upper wall portion 43 and the lower wall portion 44 of the peripheral side wall. The first element sealing portion 13 further includes a right portion and a left portion that extend in the substantially up and down direction. The right portion and the left portion are respectively located at the ends of the right side wall portion 42 and the left side wall portion 41 of the peripheral side wall. The right portion of the first element sealing portion 13 directly connects to the shroud body 4, as shown in FIG. 3.

Further, as shown in FIGS. 2 and 3, the case 6 has ribs (projections) 51, 52 as case-side engagement portions on the inner surfaces of the right and left side wall portions 41, 42. The ribs 51, 52 project to the inner side of the case 6, that is, toward the first outside air introduction passage 21. Each of the ribs 51, 52 has a substantially plate-like shape and extend in the horizontal direction, such as in the vehicle right and left direction and in the front and rear direction.

The ribs 51, 52 are formed to contact the element body 9 of the filter element 5 so that the filter element 5 is held by the case 6. For example, the ribs 51, 52 are formed such that the ribs 51, 52 are engaged with element-side engagement portion of the element body 9 when the filter element 5 is mounted in the first opening 11 of the case 6. Thus, the filter element 5 is held only by the case 6 in the vertical position. In other words, the ribs 51, 52 serve as element engagement portions and element holding portions. In the present embodiment, the element body 9 has the folds in the up and down direction. The ribs 51, 52 are received between second and third folds from the top, for example.

As shown in FIG. 2, the ribs 51, 52 are located in upper half areas (rib arrangement area) of the right and left side wall portions 41, 42. As shown in FIG. 3, the rib 51, which is formed on the left side wall portion 41, extends from the inner surface of the end wall 45 toward the filter element 5 and is parallel to the substantially horizontal direction. Further, as shown in FIG. 2, an end (rib end) 51*a* of the rib 51 is located at a position that is recessed toward the end wall 45 from the sealing surface of the first element sealing portion 13. That is, the end 51*a* of the rib 51 does not project from the sealing surface of the first element sealing portion 13 in the vehicle rearward direction.

The rib 52, which is formed on the right side wall portion 42, extends from inner surfaces of the first and second step portions 46, 47 toward the filter element 5, and is parallel to the substantially horizontal direction. Similar to the rib 51, an end (rib end) 52*a* of the rib 52 is located at a position that is recessed toward the end wall 45 from the sealing surface of the first element sealing portion 13. That is, the end 52*a* of the rib 52 does not project from the sealing surface of the first element sealing portion 13 in the vehicle rearward direction.

The ribs 51, 52 extend in the horizontal direction, such as in the vehicle rearward direction. In other words, the ribs 51, 52 extend parallel to the axis of the tubular-shaped peripheral side wall of the case 6. Since the ribs 51, 52 extend substantially parallel to a removing direction of the die for the injection molding, the ribs 51, 52 can be integrally molded with the fan shroud 4 and the case 6. Namely, even when the ribs 51, 52 are integrally molded with the case 6, the die can be easily removed from the molded case 6 in the direction parallel to the axis of the tubular-shaped peripheral side wall of the case 6. In this case, a specific core for forming the ribs 51, 52 is not necessary in the die for molding the case 6. Therefore, manufacturing costs are reduced.

Further, each of the ribs 51, 52 has a tapered shape to ease insertion into the folds of the element body 9. That is, the thickness of each rib 51, 52 is gradually reduced toward the element body 9. Further, the edge of the rib 51, 52 is chamfered or rounded so as to further ease the insertion into the folds of the element body 9.

The case 6 further has a first engagement wall 53 on the first axial end of the peripheral side wall. The first engagement wall 53 is formed on the periphery of the first element sealing portion 13 for engaging with the cap 7. The first engagement wall 53 has a substantially square or rectangular loop shape. The first engagement wall 53, for example, projects from the sealing surface of the first element sealing portion 13 toward the cap 7. That is, the first engagement wall 53 is a substantially tubular wall having a square or rectangular-shaped cross-section.

Figure 4:
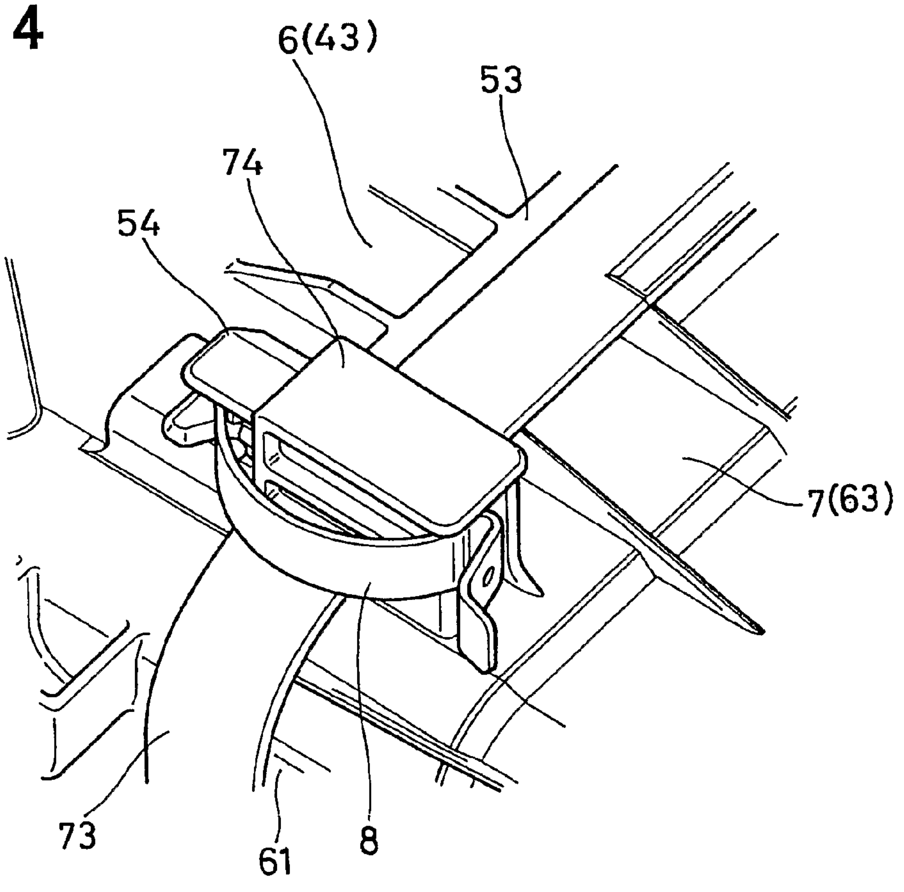
FIG. 4 is a perspective view for showing an engaged condition of the air cleaner case and an air cleaner cap of the air cleaner unit according to the first embodiment.
Figure 5B:
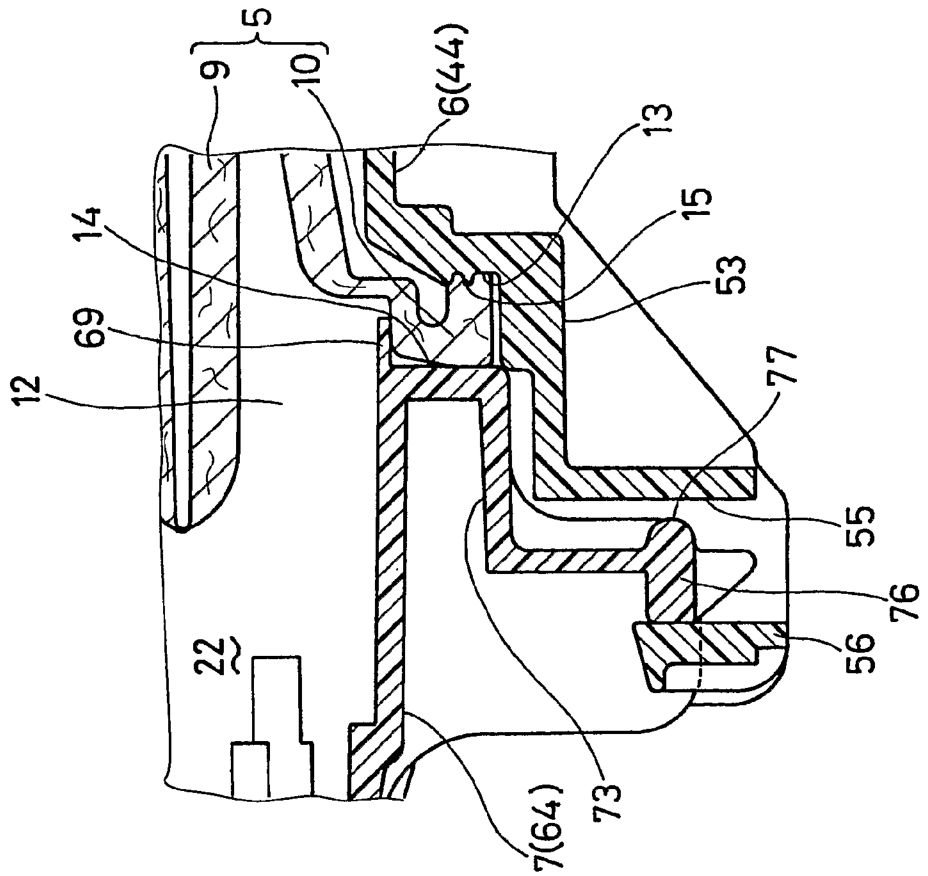
FIG. 5B is a cross-sectional view of the lower engagement portion taken along a line VB-VB in FIG. 5A.
Figure 5A:
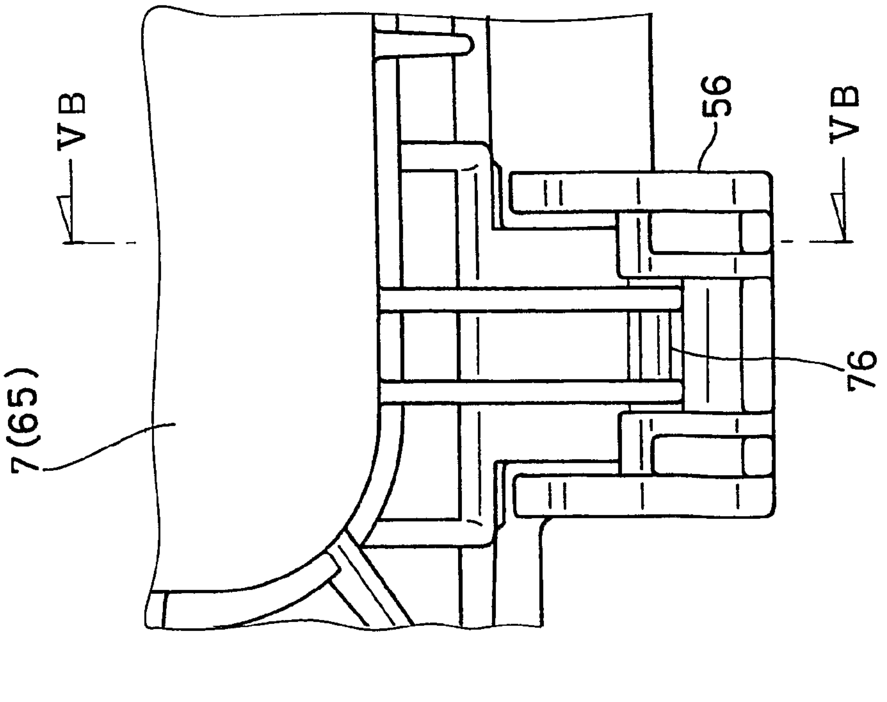
FIG. 5A is an enlarged view of a lower engagement portion of the air cleaner unit according to the first embodiment.
Figure 6:
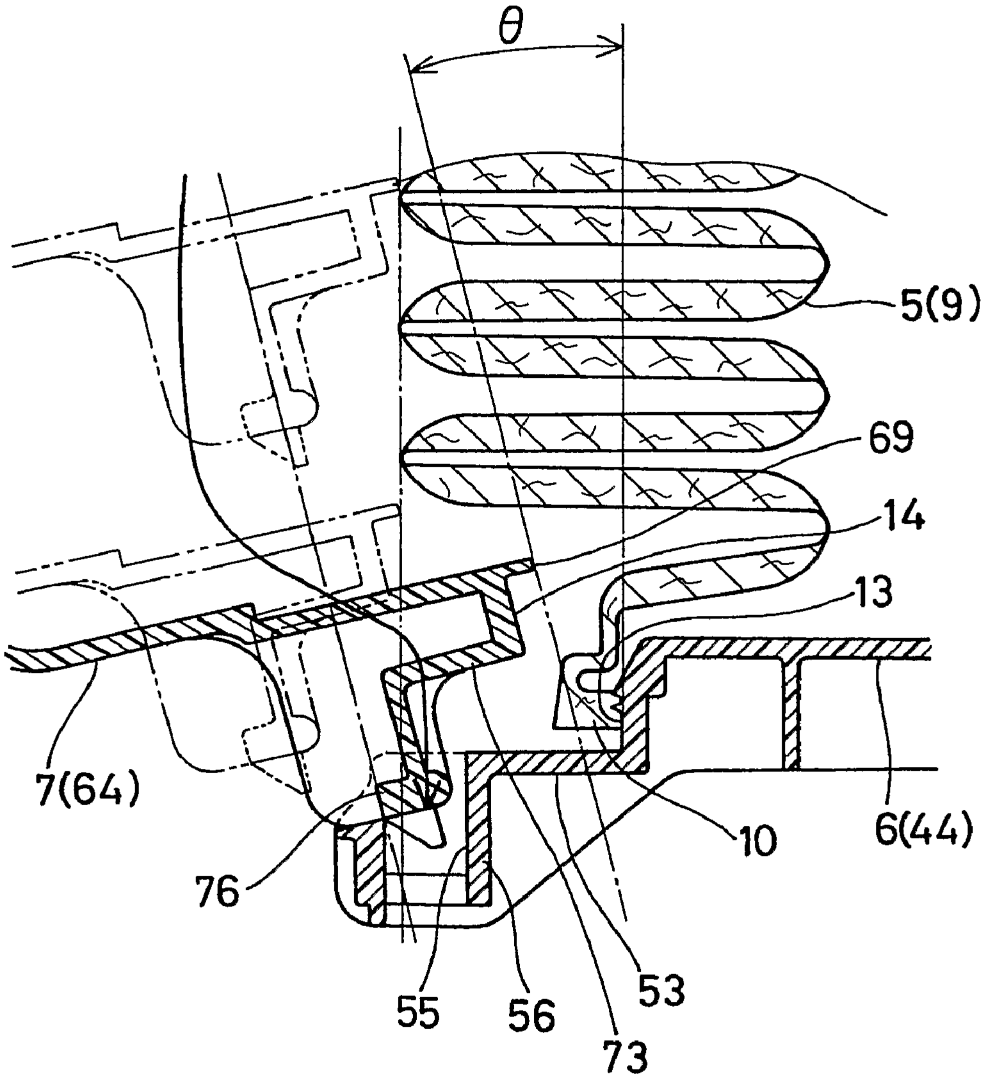
FIG. 6 is a cross-sectional view for showing a process of mounting the air cleaner cap to the air cleaner case according to the first embodiment.

As shown in FIG. 4, the case 6 has upper engagement portions 54 on the upper portion of the first engagement wall 53, the upper portion corresponding to the ends of the upper wall portion 43. In the present embodiment, the case 6, for example, has two upper engagement portions 54. Further, as shown in FIGS. 5A, 5B and 6, the case 6 has lower engagement portions 56 on the lower portion of the first engagement wall 53, the lower portion corresponding to the ends of the lower wall portion 44. In the present embodiment, the case 6, for example, has two lower engagement portions 56.

The upper engagement portions 54 are configured to be engaged with the upper portion of the cap 7. The lower engagement portions 56 has engagement holes (e.g., engagement recesses) 55 for receiving the lower portion of the cap 7. The lower engagement portions 56 receive the lower portion of the cap 7 such that the cap 7 is rotatable about the lower portion of the cap 7 to open or close the first opening 11 of the case 6. That is, the lower engagement portions 56 provide hinge receiving portions.

The cap 7 is detachably connected to the case 6. The cap 7 is, for example, made of the same resin material as the case 6. The cap 7 has a substantially container-like shape. The cap 7 includes a peripheral side wall having a polygonal tubular shape. The polygonal tubular shape, for example, has a square or rectangular-shaped cross-section. The cap 7 has an end wall 65 at a first end of the peripheral side wall, and the second opening 12 is formed at a second end of the peripheral side wall. The peripheral side wall forms the second outside air introduction passage 22 therein.

The peripheral side wall of the cap 7 includes side wall portions 61, which are opposed with respect to the substantially horizontal direction, such as the vehicle right and left direction, and extend in the substantially up and down direction. Also, the peripheral side wall of the cap 7 includes an upper wall portion 63 and a lower wall portion 64 that is opposed to the upper wall portion 63 with respect to the up and down direction. The upper wall portion 63 and the lower wall portion 64 extend in the substantially horizontal direction.

The cap 7 is disposed such that the end wall 65 extends in the substantially up and down direction and is located on a rear side of the peripheral side wall. That is, the cap 7 is disposed such that the second opening 12 opens in the vehicle frontward direction. Further, the cap 7 is coupled to the case 6 such that the second outside air introduction passage 22 is in communication with the first outside air introduction passage 21 of the case 6 through the element body 9 and the first opening 11.

The cap 7 has the second flange portion on the periphery of the second opening 12. The second flange portion provides the second element sealing portion 14 for forming the sealing surface that is opposed to the sealing surface of the first element sealing portion 13 of the case 6 through the peripheral portion 10 of the filter element 5. The second element sealing portion 14 has a substantially square or rectangular loop shape.

The sealing surface of the second element sealing portion 14 air-tightly contacts a dust side (rear surface) of the peripheral portion 10 of the filter element 5. The second element sealing portion 14 has a rib 69 that projects from the sealing surface toward the filter element 5. For example, the rib 69 is formed along the second element sealing portion 14, and hence has a substantially square or rectangular loop shape.

As shown in FIG. 5B, the rib 69 is in pressed contact with the peripheral portion 10 of the filter element 5 toward an inner surface of the first engagement wall 53 of the case 6 so as to restrict positional displacement of the peripheral portion 10 of the filter element 5.

The cap 7 has a second engagement wall 73 on the periphery of the second element sealing portion 14 to be engaged with an outer side of the first engagement wall 53 of the case 6. The second engagement wall 73, for example, has a square or rectangular loop shape. In other words, the second engagement wall 73 has a substantially tubular shape having a square or rectangular-shaped cross-section on the periphery of the second element sealing portion 14.

The lower portion of the second engagement wall 73, which corresponds to the end of the lower wall portion 64, projects from the second element sealing portion 14 in a direction opposite to the case 6. That is, the lower portion of the second engagement wall 73 partly overlaps with the lower wall portion 64. At a position adjacent to the lower engagement portion, which will be described later, the lower portion of the second engagement wall 73 is fitted to the inner side of the first engagement wall 53 of the case 6.

The upper portion of the second engagement wall 73, which corresponds to the end of the upper wall portion 63, has upper engagement portions 74. In the present embodiment, for example, the second engagement wall 73 has two upper engagement portions 74. The upper engagement portions 74 are engaged with the upper engagement portions 54 of the case 6 and are secured by the clamps 8, as shown in FIG. 4.

The cap 7 further has lower engagement portions 76 that project from an inner peripheral surface of the lower portion of the second engagement wall 73 in the downward direction. In the present embodiment, for example, the cap 7 has two lower engagement portions 76. The lower engagement portions 76 provide hinge insertion portions (cap hinge portions) that are engaged with the lower engagement portions 56 of the case 6 in a hinge manner. The lower engagement portions 76 have engagement projections (hinge shaft portions) that are received in the engagement holes 55 of the lower engagement portions 56. Further, the engagement portions 76 have ribs 77 on its front surface. The ribs 77 project toward front inner surfaces of the engagement holes 55 and have a semi-spherical shape, for example.

Next, a method of assembling the air cleaner unit 1 will be described with reference to FIGS. 1 to 6.

In the present embodiment, the filter element 5 and the cap 7 are fixed to the first opening 11 of the case 6 that is integrally formed with the left side wall of the shroud body 4. The first opening 11 of the case 6 is open at a position that is more to the rear side of the vehicle than the radiator 2. Thus, the filter element 5 is carried from the front side of the radiator 2 to the first opening 11 of the case over the radiator 2 by a worker who is standing in front of the front grill member.

The lower side of the peripheral portion 10 of the filter element 5 is brought into contact with the lower portion of the sealing surface of the first element sealing portion 13 of the case 6. The lower side of the peripheral portion 10 of the filter element 5 is in pressed contact with the engagement projection 15 of the case 6, which corresponds to the end of the lower wall portion 44.

Then, the filter element 5 is rotated such that the upper side of the peripheral portion 10 of the filter element 5 is moved forward. Thus, the upper side of the peripheral portion 10 of the filter element 5 is brought into contact with the upper portion of the sealing surface of the first element sealing portion 13. At this time, the ribs 51, 52 of the case 6 enter between the predetermined folds (e.g., the second and third folds) of the element body 9. Since the element body 9 is interfered with the ribs 51, 52 of the case 6, the movement of the filter element 5 in an assembling direction is regulated.

In the present embodiment, the ribs 51, 52 are located in the upper half areas of the right and left side wall portions 41, 42. The ends 51*a*, 52*a* of the ribs 51, 52 are located without projecting from the sealing surface of the first element sealing portion 13. That is, the ends 51*a*, 52*a* of the ribs 51, 52 are located more to the inside of the case 6 than the sealing surface of the first element sealing portion 13. Further, the ribs 51, 52 have the tapered wall shape that has the thickness reducing toward the element body 9. Therefore, the filter element 5 is smoothly fixed to the case 6, and the peripheral portion 10 of the filter element 5 is properly brought into contact with the sealing surface of the first element sealing portion 13, which is formed entirely along the periphery of the first opening 11.

Further, the upper side and the right and left sides of the peripheral portion 10 of the filter element 5 are in pressed contact with the upper portion and the right and left portions of the engagement projection 15 of the case 6, respectively, in a compressed manner.

Thus, when the filter element 5 is fixed to the first opening 11 of the case 6, the element body 9 is engaged with the ribs 51, 52 of the case 6. Thus, the filter element 5 is held only by the case 6 in the vertical position.

Next, the cap 7 is carried from the front side of the radiator 2 to the first opening 11 of the case 6 over the radiator 2. In this case, the filter element 5 has been already held in the case 6. Thus, as shown in FIG. 6, the lower engagement portions 76 of the cap 7 are inserted to the engagement holes 55 of the lower engagement portions 56 of the case 6 at a predetermined insertion angle θ relative to the sealing surface of the first element sealing portion 13 of the case 6.

Then, the cap 7 is rotated forward about the lower engagement portions 76 such that the upper wall portion 63 of the cap 7 moves forward. Further, the upper engagement portions 74 of the cap 7 are fitted to the upper engagement portions 54 of the case 6. In this case, the inner side of the second engagement wall 73 of the cap 7 is fitted on the outer side of the first engagement wall 53 of the case 6.

Next, the upper engagement portion 54 of the case 6 and the upper engagement portions 74 of the cap 7 are secured by the clamps 8. In this way, the case 6 and the cap 7 are integrated.

In the present embodiment, the cap 7 is detachably connected to the case 6 in which the filter element 5 is held in the vertical position by the engagement of the ribs 51, 52. Further, the filter element 5 is held and housed in the vertical position in a condition that the peripheral portion 10 is interposed between the sealing surfaces of the first and second element sealing portions 13, 14. Here, the vertical position means a position that is substantially parallel to the up and right direction of the vehicle and is perpendicular to the horizontal plane of the vehicle, the horizontal plane being parallel to a surface that the vehicle travels on. Further, the first and second element sealing portions 13, 14 are air-tightly sealed with the peripheral portion 10 of the filter element 5.

Next, an operation of the air cleaner unit 1 of the present embodiment will be described. When the engine is started, and the cylinders of the engine are shifted from an exhaust step to an air intake step while the intake valves are opened and the pistons are descended, a negative pressure, which is lower than an atmospheric pressure, of the combustion chambers of the cylinders is increased with the descendent of the pistons. Thus, the mixed air is drawn from the intake ports that are open.

At this time, the air, such as the outside air, is introduced in the first outside air introduction passage 21 of the case 6 from the first outside air introduction duct 17, and passes through the element body 9 of the filter element 5. Thus, impurities of the air are captured by the element body 9.

The clean air that has passed through the element body 9 is drawn into the combustion chambers of the cylinders through the second outside air introduction passage 22 of the cap 7, the second outside air introducing duct 18, the inside of the air intake pipe (intake air passage) and the intake ports. Since the clean air is drawn into the engine, the sliding abrasion of the engine due to the impurities is reduced. Thus, failure of the engine is reduced.

Figure 7:
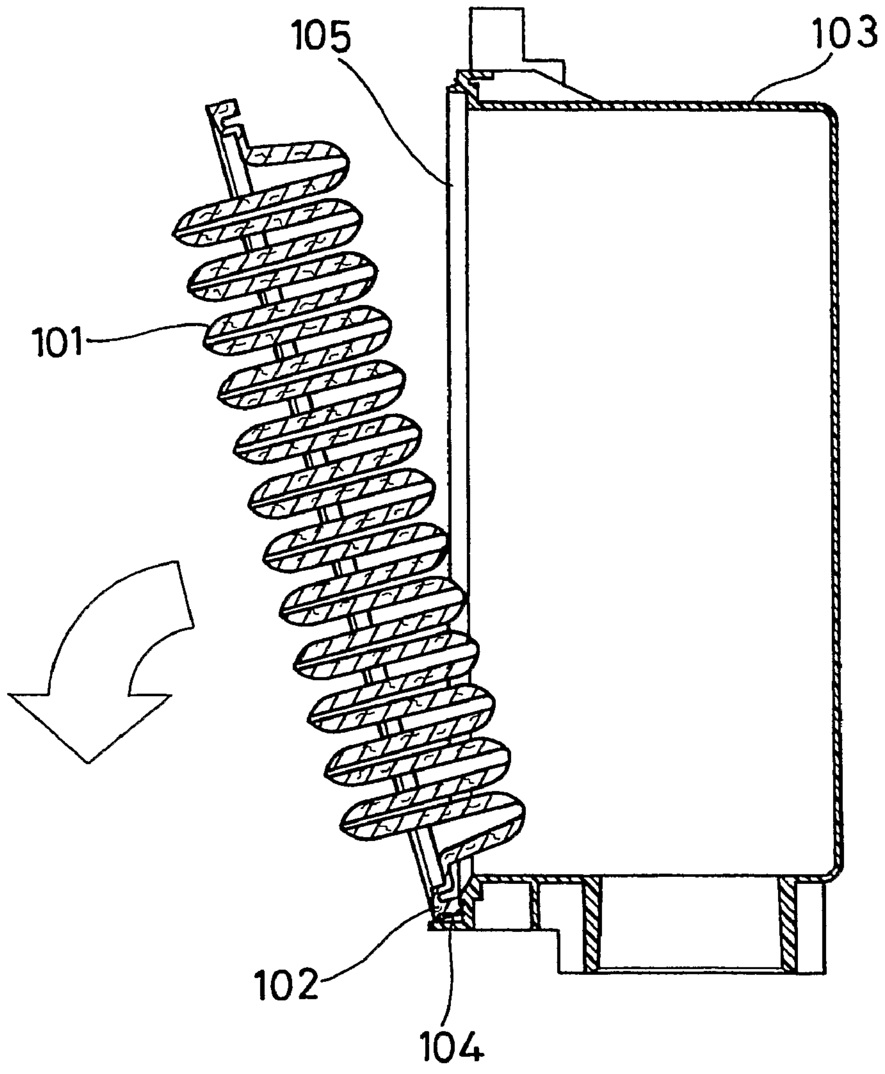
FIG. 7 RELATED ART
FIG. 7 is a cross-sectional view of an air cleaner case and a filter element of an air cleaner unit of a related art.

In the air cleaner unit shown in FIG. 7, although the filer element 101 is disposed in a vertical position, it is held by inserting the peripheral portion 102 between the flange 104 of the case 103 and the flange of the cap. Therefore, it is necessary to hold the filter element 101 before and while the cap is fixed to the case 103, to restrict the separation and displacement of the filter element 101 from the case 103.

In the present embodiment, on the other hand, the case 6 has the ribs 51, 52 and the element body 9 of the filter element 5 is received by the ribs 51, 52. Therefore, the filter element 5 is held in the vertical position by the case 6 even before the peripheral portion 10 is held between the first and second element sealing portions 13, 14, that is, before the cap 7 is fixed to the case 6.

Namely, in an assembling process, it is less likely that the filter element 5 will be dropped from the case 6. Also, since the filter element 5 can be held by the case 6, it is not necessary to support the filter element 5 with hands or using jigs when the cap 7 is being fixed to the case 6. Therefore, working efficiency improves.

In the above structure, even when the cap 7 is removed from the case 6 for replacement of the filter element 5, the filter element 5 is held in the case 6 and will not drop from the case 6. Therefore, the working efficiency further improves.

In the present embodiment, the case 6 is integrally molded with the shroud body 4 of the fan shroud 3, and the fan shroud 3 is fixed to the radiator 2 which is fixed to the portion 27, 28 of the vehicle body, through the fixing stays 31, 32. That is, the case 6 is integrated with the radiator 2 through the fan shroud 3.

The ribs 51, 52 for supporting the filter element 5 are integrally formed into the side wall portions 41, 42 of the case 6. That is, the engagement portions for restricting the dropping of the filter element 5 from the case 6 are provided only by simply changing the shape of the case 6 without changing the shape of the cap 7. Also, the filter element 5 is mounted to the portions 27, 28 of the vehicle body without increasing the assembling steps. As such, manufacturing costs reduce.

The filter element 5 is assembled to the case 6 in a limited space that is provided to enable to attach and detach the cap 7 to and from the case 6. For example, the fixing of the filter element 5 to the case 6 is performed in a small space provided between the fan shroud 3 and the engine main unit. Further, the first opening 11 of the case 6 opens in the vehicle rearward direction. Thus, the filter element 5 is brought into the small space from the front side of the front grill member over the case 6, and fixed to the first opening 11 of the case 6.

At this time, the lower side of the peripheral portion 10 of the filter element 5 is abut to the lower side of the first element sealing portion 13 of the case 6. In this condition, the filter element 5 is rotated in the frontward direction, that is, the upper portion of the filter element 5 is moved in the frontward direction so that the upper side of the peripheral portion 10 of the filter element 5 is brought into contact with the first element sealing portion 13. Thus, the filter element 5 is fixed to the case 6.

If the ribs 51, 52 are formed in lower half areas of the side walls 41, 42 of the case 6, the element body 9 is interfered with the ribs 51, 52 before the upper side of the peripheral portion 10 is brought into contact with the sealing surface of the first element sealing portion 13, while the filter element 5 is being rotated in the frontward direction. In this case, therefore, it will be difficult to properly fix the filter element 5 such that the filter element 5 is held in the vertical position only by the case 6.

In the present embodiment, on the other hand, the ribs 51, 52 are formed in the upper half areas of the side walls 41, 42 of the case 6. Further, the ends 51*a*, 52*a* of the ribs 51, 52 are recessed from the sealing surface of the first element sealing surface 13. That is, the ends 51*a*, 52*a* of the ribs 51, 52 are located more to the inner side of the case 6 than the sealing surface of the first element sealing surface 13. Moreover, the ribs 51, 52 have the tapered plate shape that has the thickness reducing toward the filter element 5. Accordingly, the filter element 5 is smoothly engaged with the ribs 51, 52 and properly held in the case 6.

In the above embodiment, the case 6 is integrally molded with the fan shroud 3. However, the case 6 can be integrally formed with or connected to another engine functional part, such as an engine head cover, an intake manifold, a throttle body, the tank of the radiator or the like. Further, the vehicle body, the frame of the vehicle, the fan shroud or the like can be used as the body member of the vehicle.

In the above embodiment, the filter element 5 is formed of unwoven cloth. However, the filter element 5 can be formed of another material such as paper, metallic mesh member, or the like. Also, the shape of the element body 9 of the filter element 5 is not limited to the folded shape having the plurality of folds, as long as the filter element 5 is held in the vertical position through the ribs 51, 52.

The casing of the air cleaner unit 1 can be made of a resinous material that includes fibers for increasing the strength, such as glass fiber and carbon fiber. In this case, the case 6 and the cap 7 are made by mixing a filler material, such as glass fiber, carbon fiber, aramid fiber, boron fiber, into a resin that is the same as the resin of the engine functional part that is integrally formed with the case 6. Further, the case 6 and the cap 7 can be made of different materials.

In the above embodiment, the case 6 and the cap 7 have the separation line in the vehicle up and down direction, such as in a direction of gravity. However, the case 6 and the cap 7 may have the separation line that is inclined relative to the direction of gravity or includes a bent.

Further, the vertical position of the filter element 5 is not limited to a vertical position that is parallel to the direction of gravity. The vertical position means a position that is generally parallel to the up and down direction of the vehicle and includes a position inclined from the vertical direction.

In the above embodiment, the case 6 and the cap 7 are coupled with respect to the vehicle front and rear direction. However, the case 6 and the cap 7 may be formed to be coupled in the substantially horizontal direction, such as in the substantially right and left direction of the vehicle or in a direction diagonal to the right and left direction.

Additional advantages and modifications will readily occur to those skilled in the art. The invention in its broader term is therefore not limited to the specific details, representative apparatus, and illustrative examples shown and described.

The invention claimed is:

1. An air cleaner unit for filtering air to be introduced into an internal combustion engine of a vehicle, the air cleaner unit comprising:

a casing defining an intake air passage through which the air flows, the casing including a first case member and a second case member, the first case member having a first opening and a first sealing surface on a periphery of the first opening, the second case member having a second opening and a second sealing surface on a periphery of the second opening, the first case member and the second case member being coupled to each other such that the first opening is opposed to the second opening in a substantially horizontal direction of the vehicle; and a filter element disposed in a substantially vertical position in the casing, the filter element having an element body pleated in a substantially up and down direction of the vehicle and a peripheral portion that is interposed between the first sealing surface and the second sealing surface, wherein the first case member includes a side wall defining the intake air passage and a projection projecting from an inner surface of the side wall toward the intake air passage, the projection is received in between pleats of the element body when the filter element is assembled to the first case member, and the filter element is held in the substantially vertical position in the casing through the projection of the first case member.

2. The air cleaner unit according to claim 1, wherein the first case member is integrated with a body member of the vehicle.

3. The air cleaner unit according to claim 1, wherein the second case member is detachably coupled to the first case member in a condition that the filter element is held in the substantially vertical position through the projection.

4. The air cleaner unit according to claim 1, wherein the filter element is engaged with the projection.

5. The air cleaner unit according to claim 1, wherein the peripheral portion is disposed on a periphery of the element body and sealed with the first and second sealing surfaces.

6. The air cleaner unit according to claim 1, wherein the side wall of the first case member has a substantially tubular shape and the first opening is defined at an end of the side wall, and the first opening is open in the substantially horizontal direction and is in communication with the second opening of the second case member through the filter element.

7. The air cleaner unit according to claim 1, wherein the side wall of the first case member includes a first wall portion and a second wall portion, the first wall portion and the second wall portion being opposed to each other in a vehicle width direction, and the first wall portion and the second wall portion extending in the substantially up and down direction of the vehicle.

8. The air cleaner unit according to claim 7, wherein the projection is formed on each of the first wall portion and the second wall portion, and the projection is a rib having a plate shape extending in the substantially horizontal direction.

9. The air cleaner unit according to claim 8, wherein the projection is located in an upper half area of each of the first and second wall portions.

10. The air cleaner unit according to claim 1, wherein the projection has a plate shape extending in the substantially horizontal direction, and has an end that is located more to inside of the first case member than the first sealing surface, the end being received in between the pleats of the element body.

11. The air cleaner unit according to claim 10, wherein the first case member has an end wall that is disposed on a front end of the side wall to be opposed to the filter element and extends in the substantially up and down direction of the vehicle, and the projection extends from an inner surface of the end wall toward the filter element.

12. The air cleaner unit according to claim 10, wherein the side wall of the first case member includes a wall portion that extends in a substantially up and down direction, the wall portion includes a step portion that defines an inner surface opposed to the filter element, and the projection extends from the inner surface of the step portion toward the filter element.

13. The air cleaner unit according to claim 1, wherein the first sealing surface is substantially parallel to an up and down direction of the vehicle.

14. The air cleaner unit according to claim 1, wherein the second case member is detachably coupled to the first case member, and the filter element is fixed to the first case member so that the filter element is held in the substantially vertical position only by the projection when the second case member is detached from the first case member.

15. The air cleaner unit according to claim 8, wherein a thickness of the rib gradually reduces toward the element body.

16. The air cleaner unit according to claim 9, wherein the rib has a thickness reducing toward the element body.

17. The air cleaner unit according to claim 11, wherein a thickness of the projection reduces toward the end that is received in between the pleats of the element body.

* * * * *